United States Patent [19]
Williamson et al.

[11] Patent Number: 5,514,309
[45] Date of Patent: May 7, 1996

[54] PULSED GAS PARISON COOLING METHOD

[75] Inventors: James T. Williamson, Kettering; Michael J. Jerbic, Beavercreek, both of Ohio

[73] Assignee: Rapid Cool Corporation, Dayton, Ohio

[21] Appl. No.: 262,854

[22] Filed: Jun. 20, 1994

Related U.S. Application Data

[60] Division of Ser. No. 95,664, Jul. 21, 1993, Pat. No. 5,338,172, which is a continuation-in-part of Ser. No. 765,128, Sep. 25, 1991, Pat. No. 5,232,641, which is a division of Ser. No. 646,071, Jan. 25, 1991, Pat. No. 5,114,327.

[51] Int. Cl.[6] ................................................ B29C 45/72
[52] U.S. Cl. .................. 264/37; 264/40.6; 264/237; 264/297.2; 264/328.8; 264/328.14; 264/336; 264/348; 425/547
[58] Field of Search .................... 264/40.6, 537, 264/538, 237, 297.2, 297.8, 328.8, 328.14, 37, 336, 348; 425/139, 143, 526, 547, 548, 549, 554, 556

[56] References Cited

U.S. PATENT DOCUMENTS

| | | |
|---|---|---|
| 4,472,131 | 9/1984 | Ryder . |
| 4,592,719 | 6/1986 | Bellehache et al. . |
| 4,690,633 | 9/1987 | Schad et al. . |
| 4,721,452 | 1/1988 | Delfer, III . |
| 5,232,641 | 8/1993 | Williamson et al. ............ 264/237 |

*Primary Examiner*—Jill L. Heitbrink
*Attorney, Agent, or Firm*—Locke Reynolds

[57] ABSTRACT

Rapid cooling of molded workpieces such as PET parisons formed in an injection molding machine is provided by a receiver receiving molded workpieces upon ejection from the molding machine, the receiver being transported out of the molding machine to an adjacent position where a cooling head coupled to a source of cooling fluid such as liquid nitrogen directs the fluid toward the surfaces of each workpiece. The cooling head engages and is sealed to the receiver to inhibit the escape of cooling fluid into the atmosphere thereby reducing cost, environmental impact, etc. A cooling program control coupled to the cooling fluid source supplies a discontinuous flow cooling fluid from said source to contact the workpieces only when the cooling head is engaged with and sealed to the receiver. A vacuum unit withdraws cooling fluid from the receiver subsequent to contact between the workpieces and the cooling fluid. The cooling fluid can then recooled and recycled for reuse.

8 Claims, 4 Drawing Sheets

5,514,309

PULSED GAS PARISON COOLING METHOD

CROSS REFERENCE TO RELATED APPLICATIONS

This is a Division of U.S. patent application Ser. No. 08/095,664, filed Jul. 21, 1993, now U.S. Pat. No. 5,338,172, which is application is a continuation-in-part of U.S. application Ser. No. 07/765,128 filed Sep. 25, 1991, now U.S. Pat. No. 5,232,641 which is in turn a divisional of Ser. No. 07/646,071 filed Jan. 25, 1991, now U.S. Pat. No. 5,114,327.

BACKGROUND OF THE INVENTION

This invention relates generally to apparatus for use in conjunction with injection molding machines for rapidly cooling work pieces molded by the molding machine. The invention relates particularly to a method and apparatus for rapidly cooling injection molding parisons to be employed in the manufacture of biaxially oriented articles such as containers for carbonated beverages and the like.

The manufacture of biaxially oriented containers such as those formed polyethylene terephthalate (PET), employs an initial step of forming a parison or preform by an injection molding process. The parisons are generally in the shape of a hollow cylinder closed at one end and are often formed in multicavity molds into which plastic material is injected around a core positioned within each cavity. Generally the core and cavity are cooled by means of a liquid flowing through channels within the walls of the core and cavity thereby cooling the plastic forming the parison to a form-stable shape defined by the core and cavity.

Once the parison is formed and cooling is initiated, the core and parison are removed from the cavity thereby exposing the outer surface of the parison to room temperature air. An ejector or stripper mechanism then strips the parisons from the cores to expose the inside surface of the parisons to room temperature air and to free the molding machine to initiate another molding cycle. As the parisons are stripped from the cores, any contribution by the cores to the form stability of the parisons is also removed thereby freeing the parisons to be modified from their initially molded shape by outside forces.

In order to reduce this post molding modification of parison shape, it is desirable that the preform be cooled as much as possible thereby enhancing its form stability. The cooling can be enhanced by merely retaining the molded article in contact with the cooled cavity and core for an extended period of time thereby allowing additional heat to be extracted from the parison. This has the undesirable affect of extending the time for each injection molding cycle thereby reducing the number of parisons which can be produced in a given unit of time.

In order to enhance the cooling of the parisons, it has been suggested to provide additional cooling apparatus. In one such apparatus disclosed in U.S. Pat. No. 4,472,131, the parison, while retained on the core rod of the mold, is positioned within a supercooling mold. The outer surface of the parison cools either by direct contact with the wall of the supercooling mold or by cold air passing through an air gap between the outer surface of the parison and the supercooling mold. The cold compressed air is introduced at a point corresponding to the tip or sprue end of the preform. After passing along the length of the outer wall of the preform, the air escapes through holes located in the mold adjacent to the preform neck ring or thread finish. During the cooling, the parison is retained on the core rod of the initial mold in which the parison was formed. Thus in order that the molding cycle of the molding machine may continue, duplicate core rods and shifting mechanisms for those core rods must be supplied to permit a reasonable production of parisons in a given unit of time.

In another disclosure of cooling apparatus found in U.S. Pat. No. 4,592,719, the parison is removed from the core rod on which it was formed by a pneumatic grip which draws atmospheric air by suction along the length of the parison between the parison outer wall and the pneumatic grip. The grip then removes the parison from the molding machine where a second grip is introduced into the interior of the parison. The second grip also causes atmospheric air to be sucked along the inner walls of the parison thereby enhancing the cooling of the parison through turbulent contact with a large volume of ambient air.

In accordance with an earlier embodiment of the present invention as disclosed in U.S. Pat. No. 5,114,327, an apparatus is provided for use with an injection molding machine which includes a receiver means for receiving molded work pieces upon ejection of the work pieces from the molding machine. A transporter means is coupled to the receiver means for transporting the receiver means relative to the molding machine from a first position within the injection molding machine to a second position adjacent to the injection molding machine. A source of cooling fluid is provided together with a directing means for directing the cooling fluid toward the surfaces of each work piece in the receiver means. A moving means coupled to the directing means moves the directing means relative to the receiver means from a disengaged position to an engaged position where the directing means and receiver means are engaged with each other. Sealing means is provided for sealing the directing means to the receiver means to restrict any escape of cooling fluid while the directing means and receiver means are engaged with each other. Sensor means coupled to the source of cooling fluid and responsive to the relative position of the receiver means and directing means releases cooling fluid from the source only when the directing means and receiving means are engaged and are sealed by the sealing means. A vacuum means is coupled to the receiver means for withdrawing cooling fluid from the receiver means subsequent to contact between the work pieces and the cooling fluid.

One feature of the earlier embodiment of the present invention is the application of a continuous flow of cooling fluid to both the internal and the external surfaces of a work piece while it is completely enclosed. This feature provides the advantage of confining the cooling fluid so as to contact the work piece repeatedly thereby insuring the extraction of a maximum amount of heat from the work piece with the minimum amount of cooled fluid to achieve a high efficiency heat extraction.

While such apparatus speeds the cooling of the parisons to an acceptable form stable temperature in a shorter time than would be experienced by mere contact with ambient air in the absence of such apparatus, further reductions in cooling time are desirable which would allow even additional increases in parison production from a given molding machine. Thus an object of the present invention is to develop a method and apparatus for reducing the time period of the cooling of the preform subsequent to injection molding thereby enhancing the productivity of the associated injection molding machine.

SUMMARY OF THE INVENTION

In accordance with the present invention, an apparatus is provided for use with an injection molding machine which includes a receiver means for receiving molded work pieces upon ejection of the work pieces from the molding machine. A transporter means is coupled to the receiver means for transporting the receiver means relative to the molding machine from a first position within the injection molding machine to a second position adjacent to the injection molding machine. A source of cooling fluid is provided together with a directing means for directing the cooling fluid toward the surfaces of each work piece in the receiver means. A moving means coupled to the directing means moves the directing means relative to the receiver means from a disengaged position to an engaged position where the directing means and receiver means are engaged with each other. Sealing means is provided for sealing the directing means to the receiver means to restrict any escape of cooling fluid while the directing means and receiver means are engaged with each other. Sensor means coupled to the source of cooling fluid and responsive to the relative position of the receiver means and directing means releases cooling fluid from the source only when the directing means and receiving means are engaged and are sealed by the sealing means. The control means includes a program means for programming a pulsed delivery of the cooling fluid to the directing means. A vacuum means is coupled to the receiver means for generally continuously withdrawing cooling fluid from the receiver means subsequent to contact between the work pieces and the cooling fluid.

One feature of the present invention is the application of a discontinuous flow of cooling fluid to both the internal and the external surfaces of a work piece while it is completely enclosed. This feature provides the surprising advantage of achieving a faster and more effective cooling of the work piece than when a continuous flow of cooling fluid is employed. A surprising advantage is also present as less cooling fluid is used than when a continuous flow is used. The discontinuous flow of cooling fluid can be programmed based on the work piece size and configuration thereby insuring the extraction of a maximum amount of heat from the work piece with the minimum amount of cooling fluid to achieve a high efficiency heat extraction.

Another feature of the present invention is the employment of a temperature sensing means for sensing the temperature of the work piece as it is cooled by the cooling fluid. The sensing means can be employed in an alarm circuit to alert a machine operator of incomplete cooling of a work piece. The sensing means can also be employed in a recording circuit to record production conditions for evaluation to achieve optimization of the process. The sensing means can also be employed as a part of the control system of the machine as a whole and is desirably positioned in the receiving means and focused on an initially hotter portion of the work piece to ensure sufficient cooling of the entire work piece.

Yet another feature of the present invention is the employment of a seal means between the receiver means and the directing means which prevents the escape of cooling fluid during the cooling process thereby permitting a recycling of the cooling fluid through a vacuum system. This feature has the advantage of permitting the use of fluids which due to cost, environmental impact, or other factors, might otherwise not be feasible. The preferred cooling fluids to be employed in the present invention are liquid nitrogen ($N_2$) and liquid carbonic (liquid $CO_2$).

While the invention is hereafter described in connection with the particular application of the methods and apparatus herein disclosed to the molding of PET parisons for subsequent manufacture into biaxially oriented containers for carbonated beverages and the like, it will be appreciated that the rapid cooling system in accordance with the present invention could be employed for work pieces of a character other than parisons. Additional features and advantages of the invention will become apparent to those skilled in the art upon consideration of the following detailed description of a preferred embodiment exemplifying the best mode of carrying out the invention as presently perceived. The detailed description particularly refers to the accompanying drawings.

DESCRIPTION OF THE PREFERRED EMBODIMENT

Figure 1:
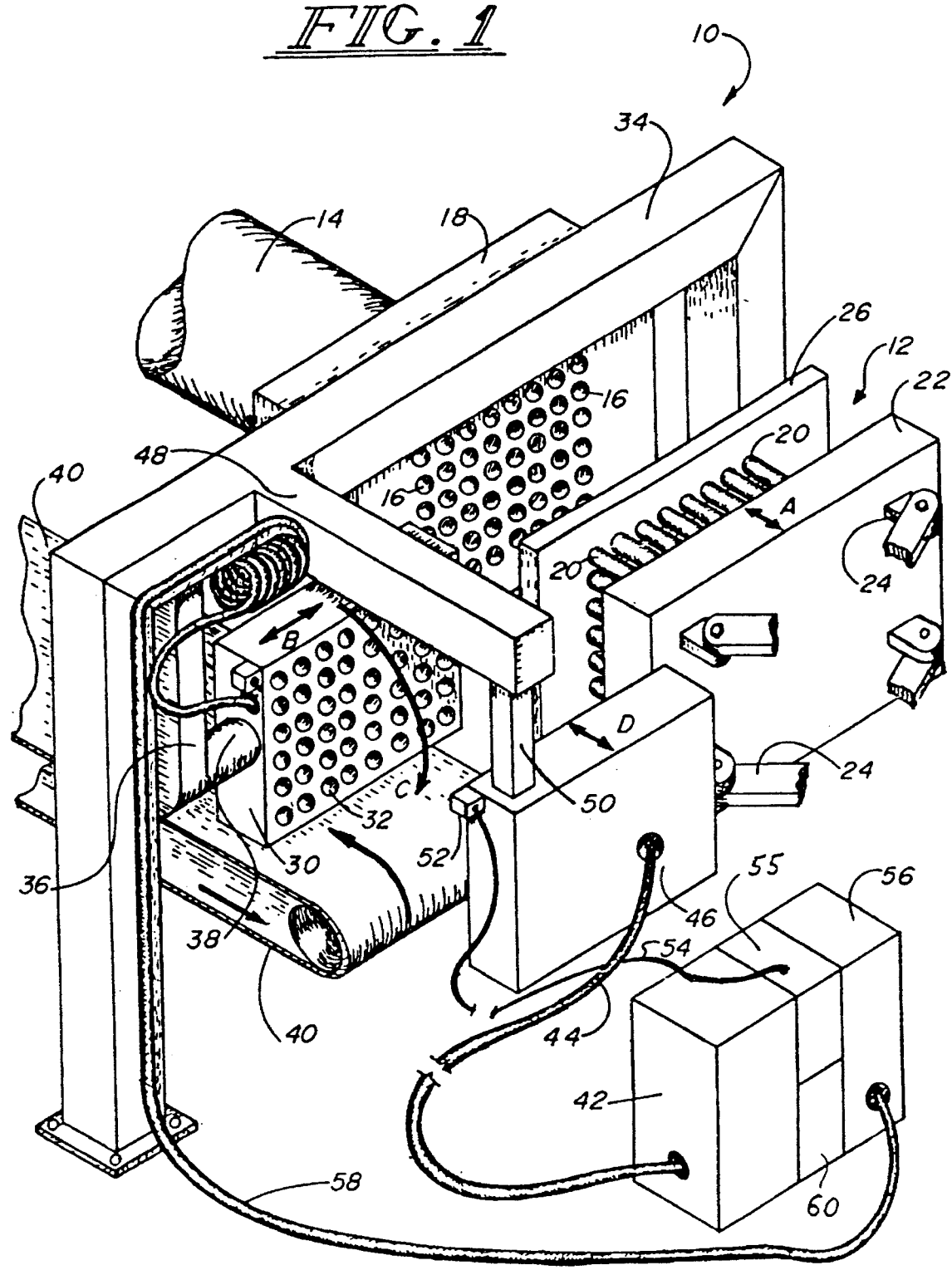
FIG. 1 is a perspective view of an apparatus in accordance with the present invention.

An apparatus 10 for use with an injection molding machine 12 is shown in FIG. 1. The injection molding machine 12 is illustrated only in part to provide an illustrative environment for the apparatus 10. The injection molding machine 12 includes an injection unit 14 which acts to supply plastic in a molten form to a plurality of cavities 16 in cavity unit 18. Each cavity 16 in the cavity unit 18 has a corresponding core 20 fixed to core unit 22 which moves relative to the cavity unit 18 by means of a power actuated toggle system 24 or similar apparatus as is conventional in the industry. The core unit reciprocates in the direction "A" so that the cavity 16 and cores 20 cooperate to define an essentially closed chamber in which a work piece such as a parison can be formed. Subsequent to the formation of the parison between core and cavity, the cavity unit moves to the position illustrated in FIG. 1 and the molded parisons are stripped from the cores 20 by a stripper plate 26 as is conventional in the industry.

The apparatus 10 in accordance with the present invention includes a receiver means in the form of a receiver frame 30. The receiver frame 30 includes a plurality of chamber elements 32 in a pattern which will permit the chamber elements to receive the molded parisons as they are stripped from the cores 20 of the injection molding machine 12 by stripper mechanism 26. The receiver frame 30 is suspended from an overhead track 34 serving to define a pathway along which the receiver travels in the direction "B". A transport mechanism of conventional design including vertical hanger 36 transports the receiver frame 30 from a first position within the injection molding machine 12 so that the chamber elements 32 are aligned with the cores 20 to a second position adjacent to the injection molding machine 12 as shown in FIG. 1.

The receiver frame 30 is coupled to the vertical hanger 36 by a discharge unit 38 which is adapted to pivot the receiver frame 30 about a horizontal axis in the direction of arc "C" so as to unload the contents of the chamber elements 32 onto conveyer belt 40 or other similar conveying means for conveying the parisons from the position of the molding machine 12 to a subsequent processing operation. Once the parisons have been removed from the molding machine and prior to their being discharged by discharge unit 38, they are subjected to a cooling fluid such as liquid nitrogen or liquid carbonic taken from source 42.

The source of cooling fluid 42 is connected by flexible conduit 44 to a cooling head 46. The cooling head 46 is suspended from track 48 which is perpendicular to track 34 and defines a pathway for movement of the cooling head 46 with respect to the receiver frame 30 when the receiver frame is in the position illustrated in FIG. 1. A moving means of conventional design including vertical support 50 causes the cooling head to move in the direction "D" between a disengaged position as shown in FIG. 1 and an engaged position where the cooling head 46 and receiver frame 30 are engaged with each other as shown generally in FIG. 4. A sealing means, not illustrated in FIG. 1, seals the cooling head to the receiver frame so as to inhibit any escape of cooling fluid while the cooling head and receiver frame are engaged with each other.

A first sensor means 52 which can be in the form of a microswitch or other similar sensor is coupled to the cooling program controller 55 by an appropriate cable 54. The sensor 52 is responsive to the relative position of the cooling head 46 and receiver frame 30 so as to permit release of cooling fluid from source 42 only when the cooling head 46 is sealed to the receiver frame. The cooling program controller 55 controls the release of cooling fluid from the source 42 as later described.

A vacuum unit 56 is coupled to the receiver frame 30 by means of an appropriate flexible conduit 58 for withdrawing the cooling fluid from the receiver frame 30 subsequent to contact between the cooling fluid and the parisons held within the chamber elements 32. The apparatus 10 can include a recycling unit 60 which can include a fluid chiller and pump of conventional design recools the cooling fluid received by the vacuum unit 56 and recycles the cooled and filtered fluid to the source 42 for subsequent use. Such a recycling unit 60 is highly desirable if not mandatory when employing fluids having significant potential for environmental impact such as liquid carbonic. In the absence of such a recycling unit 60, the cooling fluid withdrawn by the vacuum unit 56 is discharged into the atmosphere.

Figure 2:
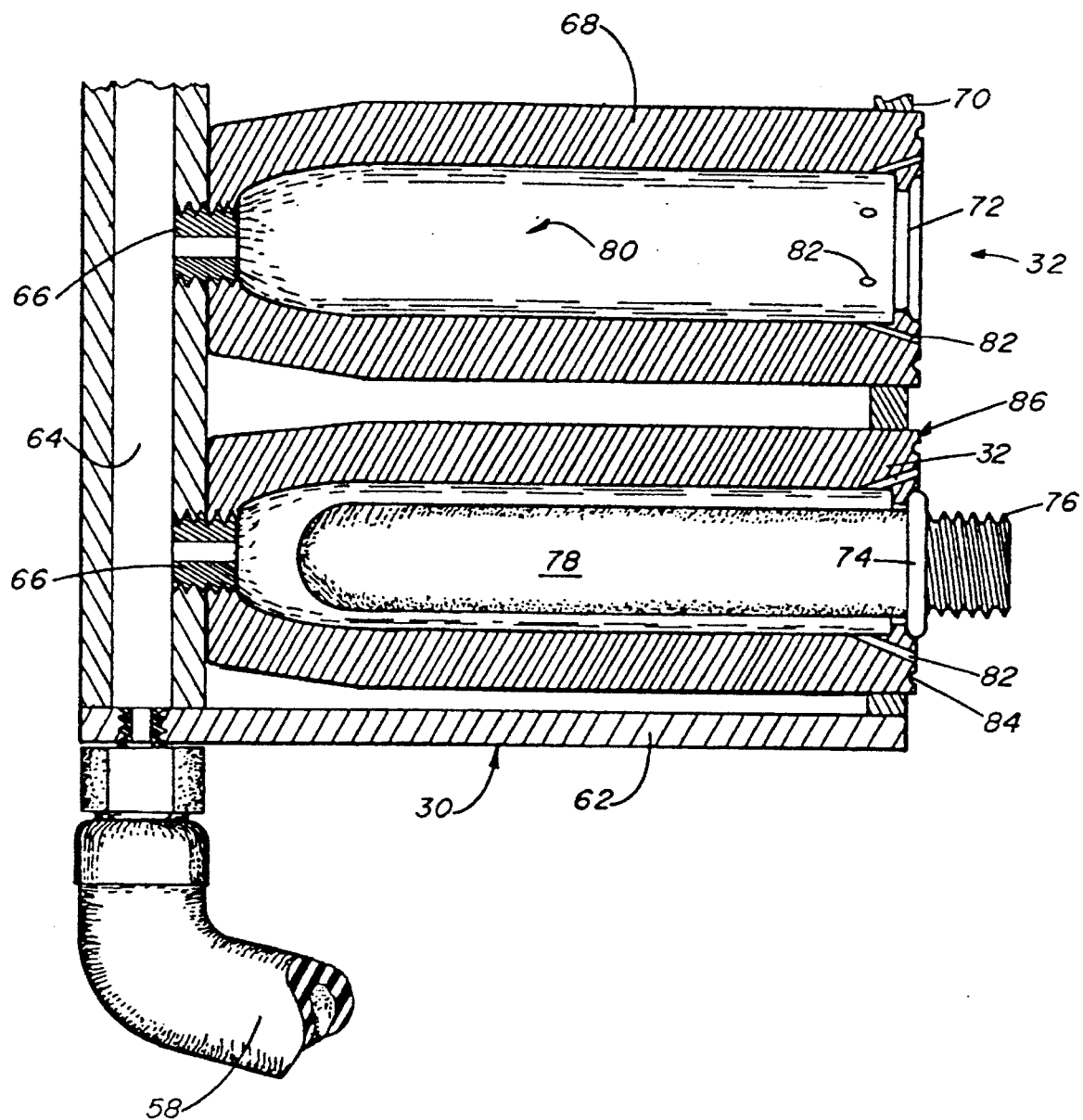
FIG. 2 is a sectional detail view of a receiving means in accordance with the present invention.

As shown in FIG. 2, the receiver frame 30 is defined by a plurality of perimeter plates 62 which cooperate to define the overall geometry of the receiver unit 30. A vacuum plenum 64 is provided at the rear of the receiver unit and is coupled to the flexible conduit 58 discussed previously. The chamber elements 32 are each coupled by a threaded element 66 to the vacuum plenum. Each of the chamber elements is seen to constitute a generally cylindrical wall member 68 extending forward from the threaded element 66 through an opening in front wall 70.

Each chamber element 32 includes an inwardly directed lip 72 at the mouth of the cylindrical wall 68 adapted to engage the lower surface of a radially extending flange 74 on parison 76 so as to suspend the parison within the chamber element 32 such that a small space is provided between the outer wall 78 of parison 76 and the inner surface 80 of wall member 68. A plurality of openings 82 on the front face 86 of the chamber elements 32 provide a pathway for cooling fluid to enter the space between the parison outer wall 78 and the chamber element inner wall 80. The openings 82 are shown in FIG. 2 as holes but can also be inclined slots as shown in FIG. 4o A seal in the form of groove 84 surrounds the plurality of openings 82 on the front face 86 of the chamber elements 32.

Figure 3:
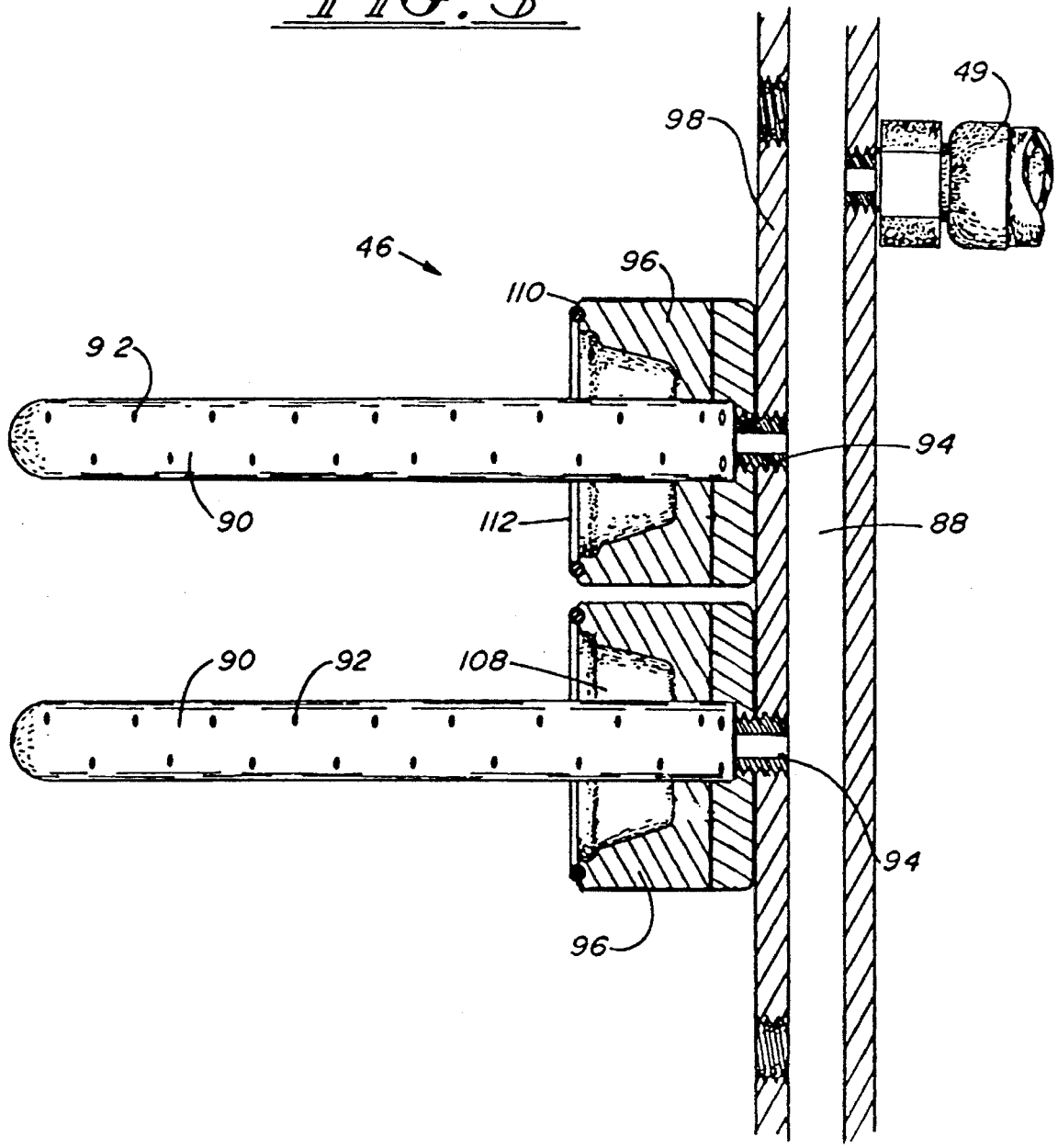
FIG. 3 is a sectional detail view of a directing means in accordance with the present invention.

A cooling head 46, shown in greater detail in FIG. 3, is coupled to conduit 44 which supplies cooling fluid from source 42 shown in FIG. 1 to a pressure plenum 88. The cooling head 46 includes a plurality of stem elements 90 which are adapted to project into the interior of the parison 76. The stem elements 90 include a plurality of small apertures 92 through which cooling fluid passes to cool the interior surface of the parison. The cooling fluid passes from the pressure plenum 88 into the stem elements 90 through hollow threaded element 94 which element also secures a cap unit 96 enclosing a finish receiving chamber 108 to the forward plate 98 of the pressure plenum 88. The lip 110 of the cap unit 96 includes a sealing means such as O-ring 112 to seal the finish receiving chamber 108 to the front face of the corresponding chamber element 32.

Figure 4:
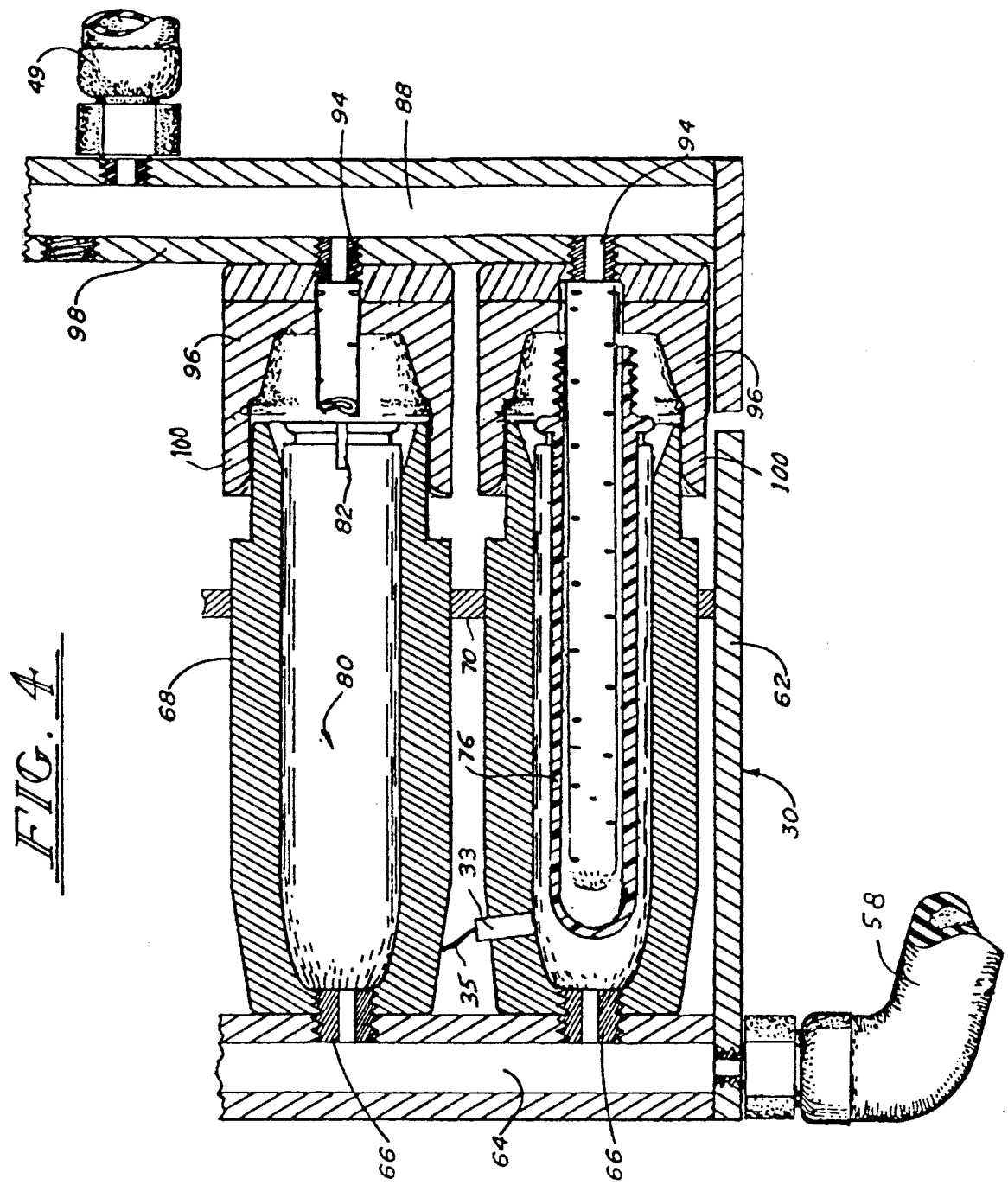
FIG. 4 is a sectional detail view of a receiving means and a directing means with a parison enclosed therebetween, and including a temperature sensing means for sensing the parison temperature.

FIG. 4 shows an alternative embodiment for the receiver unit 30 wherein at least one of the chamber elements 32 includes a heat sensor 33 for sensing the temperature of the parison 76. A cable 35 couples the heat sensor 33 to the cooling program controller 55 to provide the controller 55 with information concerning the parison temperature. The heat sensor 33 is preferably a non-contact infrared heat sensor having a very low thermal inertia which permits the sensor to reflect quick changes in temperature. The cap unit 96 of the cooling head 46 is shown to include a sleeve portion 100 which slips over the outer surface of the cylindrical wall member 68 of the receiver unit 30. The close fit between the sleeve portion 100 and the cylindrical wall member 68 defines a seal preventing unwanted discharge of the cooling gas to the environment.

In use, a set of molded parisons 76 or other similar work pieces formed in an injection molding machine 10 are received by a receiver 30 upon being stripped from cores 20 by a stripper mechanism 26. The receiver 30 is transported from a position within the molding machine 20 to a second position adjacent to the molding machine by a transporter mechanism following a pathway 34. A cooling head 46 moves along a path 48 perpendicular to pathway 34 to engage, and be sealed to the receiver frame 30 such that stem elements 90 project down into the interior of the parison 76 which are retained within the hollow cylindrical walls 68 of the chamber elements 32. Sensor 52 then activates the program controller 55 which controls the release of a cooling fluid such as liquid nitrogen or liquid carbonic from source 42 through conduit 44 into pressure plenum 88 where the liquid is warmed sufficiently to change state to a gas at about the temperature of the liquid.

The gas then is distributed through openings 92 in stem 90 to the interior and top of the parison 76. The cooling gas, prevented from escaping into the atmosphere by seal means 112, travels through openings 82 through the space between the outer wall 78 of the parison 76 and the inner wall 80 of the chamber elements 32 to further cool the exterior of the parison 76. Subsequent to contact with the walls of the parison 76, the cooling fluid is drawn into vacuum plenum 64 through hollow threaded member 66 by vacuum unit 56. The cooling fluid can then be recycled through the filtering and chilling unit 60 back to the source of cooling fluid 42.

Following the cooling of the parisons, the cooling head 46 retracts to the position shown in FIG. 1 and the receiver means is pivoted by discharge unit 38 in the direction of arrow "C" to discharge the cooled parisons onto moving conveyer belt 40 or other similar product handling device. During the cooling process, the injection molding machine 10 has executed another molding cycle. Upon return of the receiver frame to the vertical position shown in FIG. 1, receiver frame is carried into the space between the cavity unit 18 and stripper frame 26 to receive another set of parisons.

The cooling program controller 55 permits one to apply cooling fluid during any portion of the time during which the position sensor 52 indicates that the receiver unit 30 and cooling head 46 are engaged. The controller 55 also permits one to selectively apply a discontinuous flow of cooling fluid to the parison. The discontinuous flow is preferably applied as a succession of bursts of cooling fluid interspersed with periods of no flow. The advantages to be gained by such a discontinuous application of cooling fluid are shown by the following table. The table records the final measured temperature of parisons having an initial mold exit temperature of 250° F. when subjected to different patterns of cooling fluid application. In each Example liquid nitrogen at a temperature of −300° F. was introduced into the pressure plenum 88 at the same pressure for the periods of time indicated by the word "ON". In each Example the vacuum was applied to the receiver during the entire 8 seconds that the receiver and cooling head were engaged.

| EXAMPLE | FLOW TIME (SEC.) | | | | | | FINAL TEMPERATURE |
|---|---|---|---|---|---|---|---|
| EXAMPLE A(comp.) | ON | | 5½ | | | | 140° F. |
| | OFF | ½ | | 2 | | | |
| EXAMPLE B | ON | | 2½ | | 2½ | | 127° F. |
| | OFF | ½ | | 1½ | | 1 | |
| EXAMPLE C | ON | | 1½ | 1½ | 1½ | | 110° F. |
| | OFF | ½ | 1½ | 1½ | | | |

In comparative Example A the cooling fluid was applied as a continuous flow for 5½ seconds in accordance with the earlier embodiment of the present invention as disclosed in U.S. Pat. No. 5,114,327. In working Examples B and C, the cooling fluid was applied as a discontinuous flow; that is, the flow of cooling fluid was interrupted at least once during the total cooling period of eight seconds. While the total time of residence of the preforms in the receiver was the same in each of the Examples, the total flow time for the cooling fluid was reduced to 5 seconds in Example B and 4½ seconds in Example C. The surprising result achieved by the present invention is that more cooling of the preform was achieved with less total cooling fluid when the fluid is applied in short bursts rather than one long continuous flow. It will be appreciated by those skilled in the art that where, due to preform shape, weight or other factors, less cooling is needed, the "OFF" time can be lengthened thereby achieving even additional savings for process costs.

Although the invention has been described in detail with reference to the illustrated preferred embodiment, variations and modifications exist within the scope and spirit of the invention as described and is defined in the following claims.

What is claimed is:

1. A method of rapidly cooling a set of molded workpieces formed in an injection molding machine, the method comprising the steps of:

receiving said molded workpieces upon ejection from said molding machine on a receiver means;

transporting the receiver means relative to said molding machine between a first position within said injection molding machine and a second position adjacent to said injection molding machine;

providing a source of cooling fluid and directing means for directing the cooling fluid toward a surface of each workpiece in the receiver means;

moving the directing means relative to the receiver means between an engaged position where the directing means and receiver means are engaged with each other and a disengaged position where the directing means and receiver means are spaced from each other by a minimum distance; and selectively supplying a discontinuous flow of the cooling fluid from said source to the directing means when the directing means is engaged with the receiver means.

2. The method of claim 1 wherein the selectively supplying step further comprises the steps of sensing the relative position of the receiver means and the directing means, and allowing said discontinuous flow of the cooling fluid through the directing means toward said workpieces only when the receiver means and the directing means are contiguous to each other.

3. The method of claim 2 further comprising the step of recycling the withdrawn cooling fluid through a cooler to permit reuse of the cooling fluid.

4. The method of claim 2 wherein the receiving step further comprises the step of positioning an outside surface of said workpieces in spaced-apart relation from the receiver means to allow cooling fluid to contact said outside surface of the workpieces.

5. The method of claim 2 further comprising the step of discharging the workpieces from the receiver means subsequent to cooling of the workpieces by the cooling fluid.

6. The method of claim 5 wherein the discharging step further comprises the step of rotating the receiver means through an angle sufficient to cause said workpieces to be dumped from the receiver means.

7. The method of claim 2 further comprising the step of inhibiting the escape of cooling fluid into the atmosphere.

8. The method of claim 7 further comprising the step of withdrawing cooling fluid from the receiver means subsequent to contact between the workpieces and the cooling fluid.

\* \* \* \* \*